United States Patent
Calciu et al.

(10) Patent No.: US 9,361,152 B2
(45) Date of Patent: Jun. 7, 2016

(54) TRANSACTIONAL MEMORY MANAGEMENT TECHNIQUES

(71) Applicant: Intel Corporation, Santa Clara, CA (US)

(72) Inventors: Irina Calciu, Santa Clara, CA (US); Justin E. Gottschlich, Santa Clara, CA (US); Tatiana Shpeisman, Menlo Park, CA (US)

(73) Assignee: INTEL CORPORATION, Santa Clara, CA (US)

(*) Notice: Subject to any disclaimer, the term of this patent is extended or adjusted under 35 U.S.C. 154(b) by 108 days.

(21) Appl. No.: 14/129,936

(22) PCT Filed: Jul. 15, 2013

(86) PCT No.: PCT/US2013/050491
§ 371 (c)(1),
(2) Date: Dec. 28, 2013

(87) PCT Pub. No.: WO2015/009275
PCT Pub. Date: Jan. 22, 2015

(65) Prior Publication Data
US 2015/0100741 A1    Apr. 9, 2015

(51) Int. Cl.
*G06F 12/10*    (2006.01)
*G06F 9/46*    (2006.01)
*G06F 9/44*    (2006.01)
*G06F 12/08*    (2016.01)
*G06F 3/06*    (2006.01)

(52) U.S. Cl.
CPC ........ *G06F 9/467* (2013.01); *G06F 9/44* (2013.01); *G06F 3/067* (2013.01); *G06F 9/466* (2013.01); *G06F 12/0813* (2013.01)

(58) Field of Classification Search
None
See application file for complete search history.

(56) References Cited

U.S. PATENT DOCUMENTS

| 2007/0022051 A1* | 1/2007 | Regan ............. G06Q 20/102 705/40 |
| 2007/0198781 A1 | 8/2007 | Dice et al. |
| 2009/0172299 A1* | 7/2009 | Goodman ........... G06F 9/466 711/147 |
| 2011/0145553 A1 | 6/2011 | Levanoni et al. |
| 2013/0013899 A1 | 1/2013 | Barton et al. |

OTHER PUBLICATIONS

Dice, et al., "Early Experience with a Commercial Hardware Transactional Memory Implementation", ASPLOS'09, Mar. 7-11, 2009, Washington, DC, USA. ACM 978-1-60558-215-Mar. 9, 2003, 12 pages.

(Continued)

*Primary Examiner* — Duc Doan

(57) ABSTRACT

Techniques for improved transactional memory management are described. In one embodiment, for example, an apparatus may comprise a processor element, an execution component for execution by the processor element to concurrently execute a software transaction and a hardware transaction according to a transactional memory process, a tracking component for execution by the processor element to activate a global lock to indicate that the software transaction is undergoing execution, and a finalization component for execution by the processor element to commit the software transaction and deactivate the global lock when execution of the software transaction completes, the finalization component to abort the hardware transaction when the global lock is active when execution of the hardware transaction completes. Other embodiments are described and claimed.

23 Claims, 10 Drawing Sheets

(56) References Cited

OTHER PUBLICATIONS

Dalessandro, et al., "Hybrid TM Using NOrec STM" Poster abstract ASPLOS (2010) 1 page.
Dalessandro, et al., "Hybrid NOrec : A Case Study in the Effectiveness of Best Effort Hardware Transactional Memory", ASPLOS'11, Mar. 5-11, 2011, Newport Beach, California, USA, 2011 ACM 978-1-4503-0266-Jan. 11, 2003, 13 pages.
Damron et al., "Hybrid Transactional Memory", ASPLOS'06 Oct. 21-25, 2006, San Jose, California, USA. ACM 1-59593-451-0/06/0010, 11 pages.
Lev et al., "PhTM : Phased Transactional Memory", TRANSACT 2007, 11 pages.
International Search Report and Written Opinion received for PCT Patent Application No. PCT/US2013/050491, mailed Apr. 30, 2014, 9 pages.

* cited by examiner

*FIG. 7*

Storage Medium 700

*Computer Executable Instructions for 200*

*Computer Executable Instructions for 300*

*Computer Executable Instructions for 400*

*Computer Executable Instructions for 500*

*Computer Executable Instructions for 600*

FIG. 9
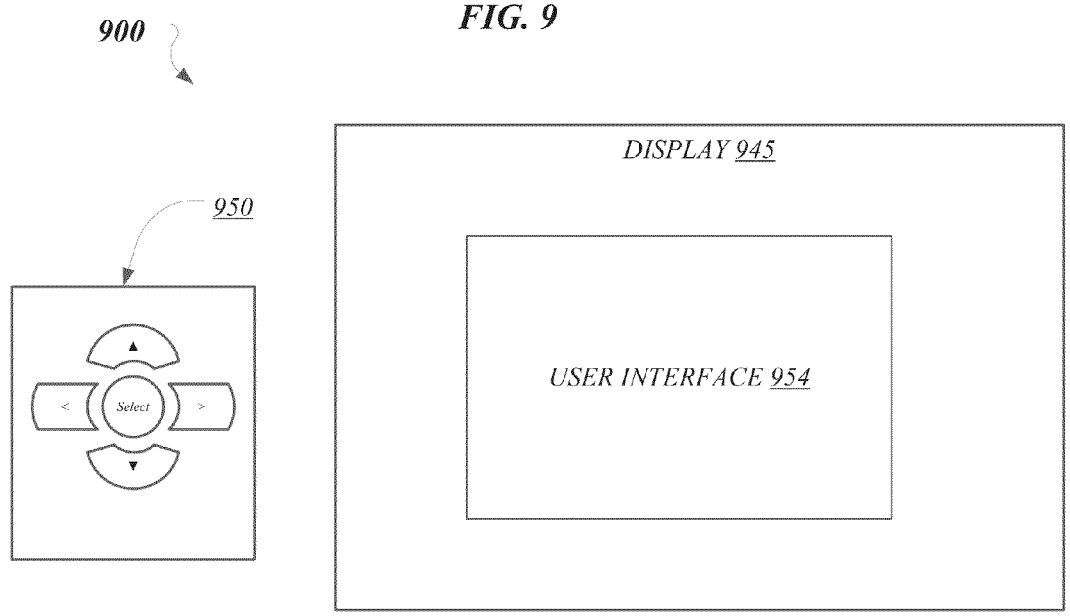
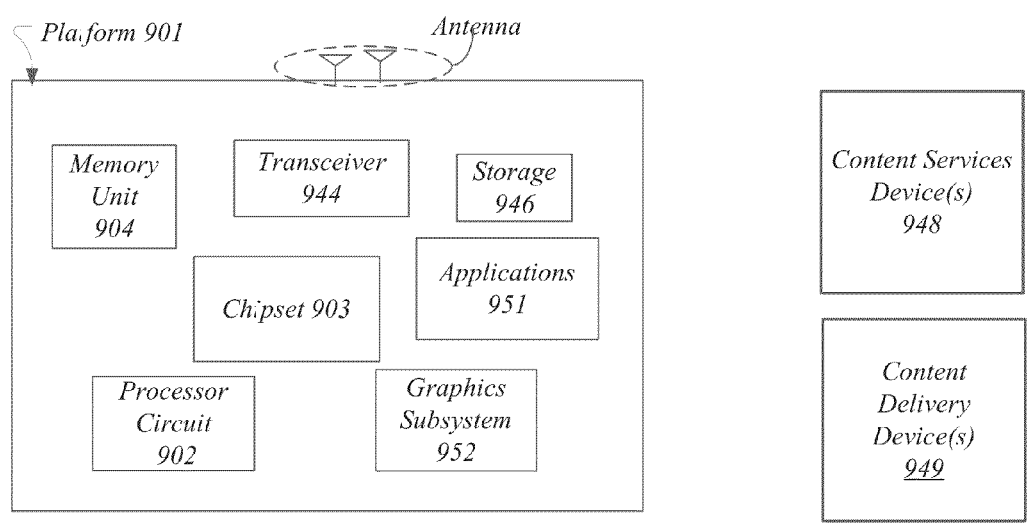

TRANSACTIONAL MEMORY MANAGEMENT TECHNIQUES

TECHNICAL FIELD

Embodiments described herein generally relate to the management of shared memory access synchronization in parallel programming computing environments.

BACKGROUND

In parallel programming computing environments, when parallel programs share access to the same memory locations, this access must be properly managed and synchronized. In some such environments, a transactional memory paradigm may be employed to manage synchronized memory access by threads corresponding to parallel programs. According to a transactional memory approach, threads can speculatively execute transactions without altering the contents of shared memory locations until the transactions subsequently commit. If a conflict is detected between two transactions, one of the transactions may be aborted so that the other transaction can commit, at which time the committed transaction may alter the contents of the shared memory locations.

BRIEF DESCRIPTION OF THE DRAWINGS

FIG. 7 illustrates one embodiment of a storage medium.
FIG. 9 illustrates one embodiment of a third system.

DETAILED DESCRIPTION

Figure 1:
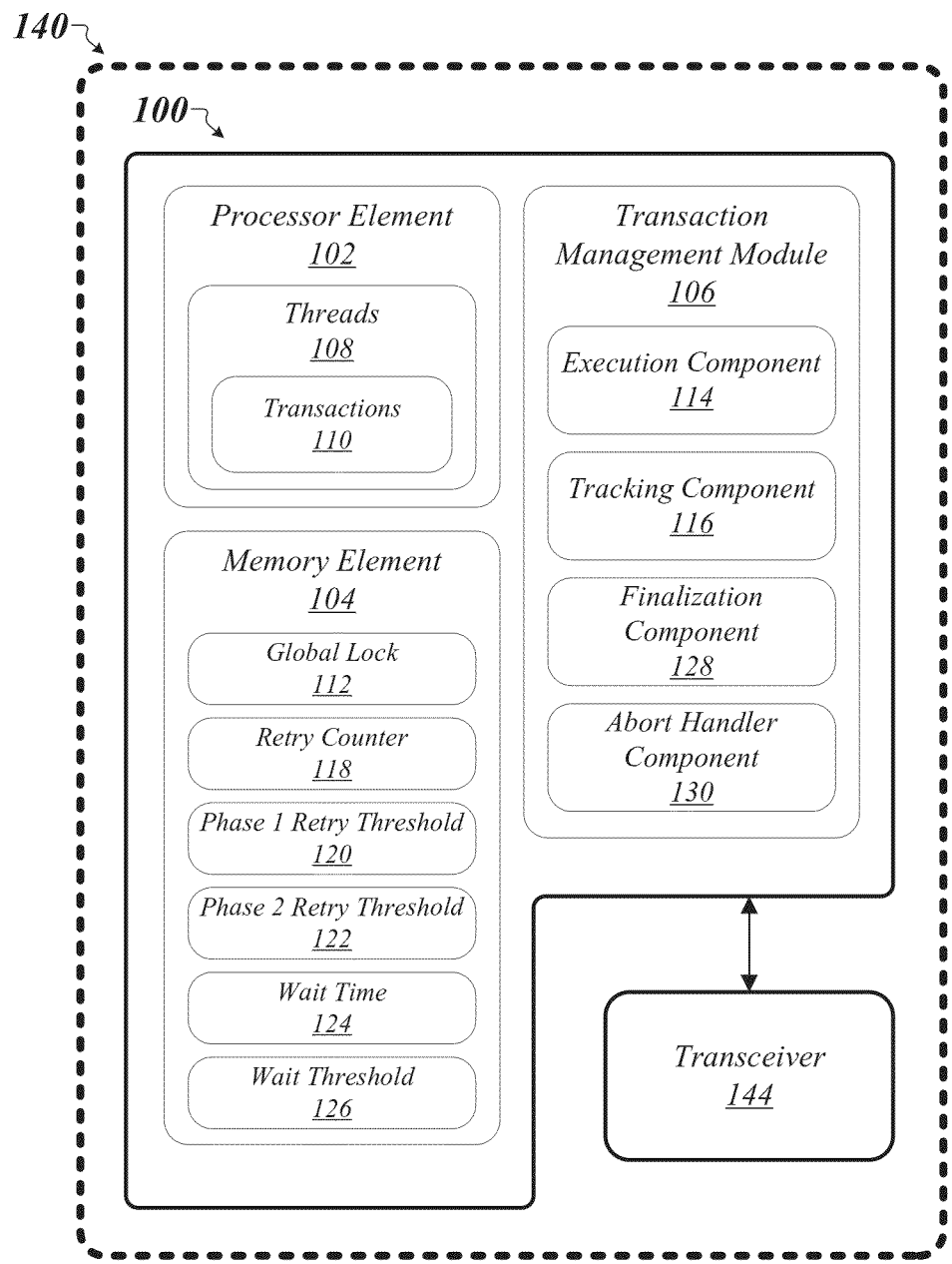
FIG. 1 illustrates one embodiment of an apparatus and one embodiment of a first system.

According to a transactional memory paradigm in a parallel programming environment, transactions are handled using a succeed-or-fail approach in which the transactions are speculatively executed without altering the contents of shared memory locations until those transactions subsequently commit. As such, transactions are performed atomically, such that they appear to the rest of the system to occur instantaneously at the time that they commit. These properties enable the realization of consistency and isolation with respect to transactions handled in parallel.

Software transactional memory is one conventional approach to implementing a transactional memory paradigm, and may involve the use of runtime library and/or programming language transactional memory semantics. Software transactional memory techniques may involve substantial associated overhead, however. Hardware transactional memory is another conventional approach to implementing a transactional memory paradigm, and may involve the use processors, cache, bus protocols, and/or other elements that support transactions. Hardware transactional memory techniques typically provide faster transaction execution with less associated overhead, but are typically bounded by size. Additionally, conventional hardware transactional memory techniques typically involve a best effort approach according to which forward progress may not occur. A particular transaction in a hardware transactional memory system may indefinitely repeat a cycle of encountering a same error, aborting, failing to commit, and re-executing, because no mechanism typically exists to ensure that the transaction is handled differently such that the cycle is broken.

A hybrid transactional memory approach may be utilized in order to realize the faster transaction execution and reduced overhead associated with hardware transactional memory while ensuring forward progress for handled transactions. According to a hybrid transactional memory approach, each transaction is initially handled in hardware, and subsequently handled in software if forward progress cannot be achieved in hardware. One drawback of some conventional hybrid transactional memory approaches may be that they do not allow concurrent execution of software and hardware transactions. In other conventional hybrid transactional memory approaches, concurrent execution of software and hardware transactions may be possible, but may require the use of particular hardware that supports escape actions and/or may require compiler-level support for transaction-level source code annotations. In order to address these drawbacks, various embodiments are directed to hybrid transactional memory systems in which a global lock is utilized to enable concurrent execution of a software transaction and one or more hardware transactions. Some embodiments may enable concurrent execution of a software transaction and one or more hardware transactions without requiring that particular hardware be used, without requiring that escape actions be utilized, and/or without requiring compiler-level support.

Various embodiments may be generally directed to improved transactional memory management techniques. In one embodiment, for example, an apparatus may comprise a processor element, an execution component for execution by the processor element to concurrently execute a software transaction and a hardware transaction according to a transactional memory process, a tracking component for execution by the processor element to activate a global lock to indicate that the software transaction is undergoing execution, and a finalization component for execution by the processor element to commit the software transaction and deactivate the global lock when execution of the software transaction completes, the finalization component to abort the hardware transaction when the global lock is active when execution of the hardware transaction completes. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1 illustrates a block diagram of an apparatus 100. As shown in FIG. 1, apparatus 100 comprises multiple elements including processor element 102, a memory element 104, and a transaction management module 106. The embodiments, however, are not limited to the type, number, or arrangement of elements shown in this figure.

In various embodiments, apparatus 100 may comprise processor element 102. Processor element 102 may be implemented using any processor or logic device capable of implementing task-level parallelism. In some embodiments, for example, processor element 102 may comprise a multi-core processor. In another example embodiment, processor element 102 may comprise multiple processors arranged to perform tasks in parallel. The embodiments are not limited to these examples.

In various embodiments, apparatus 100 may comprise or be arranged to communicatively couple with a memory element 104. Memory element 104 may be implemented using any machine-readable or computer-readable media capable of storing data, including both volatile and non-volatile memory. In some embodiments, memory element 104 may comprise a cache for processor element 102. In various embodiments, memory element 104 may additionally or alternatively comprise other types of data storage media, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory element 104 may be included on the same integrated circuit as processor element 102, or alternatively some portion or all of memory element 104 may be disposed on an integrated circuit or other medium, for example a hard disk drive, that is external to the integrated circuit of processor element 102. Although memory element 104 is comprised within apparatus 100 in FIG. 1, memory element 104 may be external to apparatus 100 in some embodiments. The embodiments are not limited in this context.

In some embodiments, apparatus 100 may comprise transaction management module 106. Transaction management module 106 may comprise circuitry, logic, and/or instructions operative to manage the performance of transactions at apparatus 100 according to a transactional memory paradigm. In various embodiments, transaction management module 106 may be operative to cause performance of both hardware transactions and software transactions at apparatus 100. Hardware transactions may comprise transactions executed directly by logic device circuitry within processor element 102. Software transactions may comprise transactions executed indirectly by programming logic running on processor element 102. It is worthy of note that according to a transactional memory paradigm, threads can speculatively execute transactions without altering the contents of shared memory locations until the transactions subsequently commit. If a conflict or potential conflict is determined after a transaction is executed, the transaction may then be aborted rather than being allowed to commit. As such, transactions may be aborted after they are executed. Further, any particular transaction may be re-executed one or more times in the event that it is not committed after an initial execution. Thus, under some circumstances, a particular transaction may be repeatedly executed and aborted prior to ultimately being allowed to commit. The embodiments are not limited in this context.

FIG. 1 also illustrates a block diagram of a system 140. System 140 may comprise any of the aforementioned elements of apparatus 100. System 140 may further comprise a transceiver 144. Transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 144 may operate in accordance with one or more applicable standards in any version. The embodiments are not limited in this context.

In general operation, apparatus 100 and/or system 140 may be operative to perform transactions according to a transactional memory algorithm. More particularly, apparatus 100 and/or system 140 may be operative to implement a hybrid transactional memory algorithm, according to which transactions may be executed in both hardware and software. In some embodiments, according to the hybrid transactional memory algorithm, any particular transaction may first be attempted in hardware, and then may be attempted in software if attempts to commit via hardware are unsuccessful. In various embodiments, the hybrid transactional memory algorithm may enable the realization of the faster transaction execution and reduced overhead characteristics associated with hardware transactional memory while ensuring forward progress for handled transactions by using software transactional memory as a fallback.

In various embodiments, the hybrid transactional memory algorithm may enable the concurrent execution of a software transaction and one or more hardware transactions without imposing some of the design restrictions exhibited by conventional hybrid transactional memory systems. For example, unlike some conventional hybrid transactional memory systems that require the use of particular hardware that supports escape actions, various embodiments may not require the use of particular hardware and may not require support for escape actions. As another example, unlike some conventional hybrid transactional memory systems that require compiler-level support for transaction-level source code annotations, various embodiments may enable the concurrent execution of a software transaction and one or more hardware transactions without requiring compiler-level support. The embodiments are not limited in this context.

In some embodiments, processor element 102 may host one or more threads 108. Each thread 108 may correspond to an application or program running on processor element 102, and any particular application or program may have more than one associated thread 108. An application or program may utilize a particular thread 108 to request performance of one or more transactions 110. Transactions 110 may comprise calculations or other tasks to be performed by processor element 102. The embodiments are not limited in this context.

In various embodiments, when a thread 108 requests execution of a transaction 110, transaction management module 106 may be operative to manage the transaction 110 according to a hybrid transactional memory algorithm. In some embodiments, the hybrid transactional memory algorithm may comprise multiple execution phases during which attempts may be made to execute and commit the transaction 110. In various embodiments, the hybrid transactional memory algorithm may comprise a first hardware phase, a second hardware phase, and a software phase. In some embodiments, transaction management module 106 may be operative to utilize the second hardware phase for the transaction 110 only after the first hardware phase has been unsuccessful, and may be operative to utilize the software phase for the transaction 110 only after the second hardware phase has been unsuccessful. In various embodiments, the first hardware phase may comprise a more aggressive hardware execution phase, the second hardware phase may comprise a more conservative hardware execution phase, and the software phase may comprise a fallback execution phase during which the transaction 110 is assigned top priority to ensure that it will commit and that forward progress will be achieved. The embodiments are not limited in this context.

In some embodiments, transaction management module 106 may utilize a global lock 112 in order to enable the concurrent execution of a software transaction and one or more hardware transactions. In various embodiments, transaction management module 106 may be operative to cause the global lock 112 to be set or active when a software transaction is undergoing execution, and to cause the global lock 112 to be cleared or inactive when no software transaction is undergoing execution. In some embodiments, global lock 112 may comprise a spin lock. In other embodiments, a Mellor-Crummey-Scott (MCS) lock may be used for global lock 112 in order to reduce contention on the lock cache line. In various such embodiments, the "MCS_acquire" and "MCS_release" methods may be utilized to take advantage of hardware transactions to speed up the performance of compare-and-swap (CAS) instructions. The embodiments are not limited in this context.

In some embodiments, transaction management module 106 may be operative to allow some hardware transactions to execute but prevent hardware transactions from committing when the global lock 112 is set or active. In various embodiments, transaction management module 106 may be operative to permit hardware transactions to execute in the first hardware phase when the global lock 112 is set, but may not permit hardware transactions to execute in the second hardware phase when the global lock is set. As such, the first hardware phase may comprise a more aggressive execution phase, while the second hardware phase may comprise a more conservative execution phase, during which the system waits for an inactive global lock 112 before executing the transaction 110. In some embodiments, the software phase may comprise a fallback execution phase during which the transaction 110 is assigned top priority to ensure that it will commit and that forward progress will be achieved. The embodiments are not limited in this context.

In various embodiments, transaction management module 106 may comprise execution component 114. In some embodiments, execution component 114 may comprise logic, circuitry, and/or instructions operative to execute transactions 110. In various embodiments, each time a thread 108 requests execution of a new transaction 110, execution component 114 may be operative to perform one or more executions of the transaction 110. In some embodiments, execution component 114 may be operative to initially execute the transaction 110 one or more times as a hardware transaction, and to subsequently execute the transaction 110 as a software transaction if it is unable to commit when executed in hardware. In various embodiments, execution component 114 may be operative to execute the transaction 110 one or more times in a first hardware phase, to execute the transaction 110 one or more times in a second hardware phase if it is unable to commit during the first hardware phase, and to execute the transaction 110 in a software phase if it is unable to commit during the second hardware phase. The embodiments are not limited in this context.

In some embodiments, execution component 114 may be operative to check global lock 112 prior to each execution of the transaction 110 during the first hardware phase and/or the second hardware phase. In various embodiments, during the first hardware phase, execution component 114 may be operative to check global lock 112 prior to execution of the transaction 110, but to proceed with execution of the transaction 110 regardless of the state of global lock 112. In some embodiments, by checking global lock 112 prior to execution of the transaction 110, execution component 114 may be operative to increase a probability that the global lock value will be present in a cache line of a processor core executing the transaction 110, which may yield a temporal locality performance benefit if and when the transaction is committed in the first hardware phase. In various embodiments, during the second hardware phase, execution component 114 may be operative to check global lock 112 prior to execution of the transaction 110, and if global lock 112 is set, execution component 114 may be operative to wait for global lock 112 to be cleared before executing the transaction 110. The embodiments are not limited in this context.

In various embodiments, execution component 114 may be operative to check global lock 112 prior to execution of the transaction 110 in the software phase. In some embodiments, if global lock 112 is active, execution component 114 may be operative to wait by performing a number of "no operations" (NOPs) and then may recheck global lock 112. In various embodiments, each successive time that execution component 114 finds global lock 112 to be active, execution component 114 may wait a longer period of time before rechecking global lock 112. In some embodiments, execution component 114 may be operative to wait an amount of time defined by a wait time 124, and may be operative to exponentially increase the wait time 124 each time it determines that global lock 112 is still active. In various embodiments, execution component 114 may be operative to continually increase wait time 124 until it reaches a wait threshold 126. In some embodiments, once wait time 124 has reached wait threshold 126, execution component may not further increase wait time 124. The embodiments are not limited in this context.

In some embodiments, transaction management module 106 may comprise tracking component 116. In various embodiments, tracking component 116 may comprise logic, circuitry, and/or instructions operative to manage global lock 112, a retry counter 118, a phase 1 retry threshold 120, and phase 2 retry threshold 122. In some embodiments, tracking component 116 may be operative to set global lock 112 based on instructions from execution component 114. For example, execution component 114 may be operative to instruct tracking component 116 to set global lock 112 when execution component 114 begins execution of a transaction 110 in the software phase. In various embodiments, retry counter 118 may comprise a running total number of attempts that have been made to perform the transaction 110. In some embodiments, the phase 1 retry threshold 120 may comprise a number of attempts after which execution component 114 should proceed from hardware phase 1 to hardware phase 2, and the phase 2 retry threshold 122 may comprise a number of attempts after which execution component 114 should proceed from hardware phase 2 to the software phase. In various embodiments, when a new transaction 110 is received, tracking component 116 may be operative to reset retry counter 118 to zero. In some embodiments, after each execution of the transaction 110, tracking component 116 may be operative to increment retry counter 118. The embodiments are not limited in this context.

In various embodiments, transaction management module 106 may comprise finalization component 128. In some embodiments, finalization component 128 may comprise logic, circuitry, and/or instructions operative to determine whether to commit or abort transactions 110 after they are executed by execution component 114. In various embodiments, finalization component 128 may be operative to determine that any particular transaction 110 is to be aborted when the transaction 110 conflicts or potentially conflicts with another transaction. In some embodiments, finalization component 128 may be operative to determine whether a transaction 110 may potentially conflict with a concurrent software transaction by checking global lock 112. In various embodiments, if global lock 112 is set and the transaction 110 is a hardware transaction, finalization component 128 may be operative to determine that the transaction 110 is to be aborted. In some embodiments, if global lock 112 is set and the transaction is a software transaction, finalization component 128 may be operative to commit the transaction 110 and instruct tracking component 116 to release global lock 112 and clear retry counter 118. In various embodiments, if global lock 112 is not set, finalization component 128 may be operative to commit the transaction 110 and instruct tracking component 116 to clear retry counter 118. The embodiments are not limited in this context.

In some embodiments, transaction management module 106 may comprise abort handler component 130. In various embodiments, abort handler component 130 may comprise logic, circuitry, and/or instructions operative to handle aborts of transactions 110 indicated by finalization component 128. In some embodiments, abort handler component 130 may be operative to determine whether a next attempted performance of an aborted transaction 110 should occur in the first hardware phase, the second hardware phase, or the software phase. In various embodiments, abort handler component 130 may be operative to determine whether the transaction 110 is to be aborted due to a conflict or potential conflict with another transaction or for another reason. If the transaction 110 was aborted for another reason, such as due to an illegal instruction, a capacity overflow, or a cache associativity overflow due to irregular memory access patterns, abort handler component 130 may be operative to determine that execution component 114 should proceed directly to the software phase. If the transaction 110 was aborted due to a conflict or potential conflict with another transaction, abort handler component 130 may be operative to determine whether the transaction 110 should be retried in the current phase or in a next phase.

In various embodiments, to determine a phase for a next attempted performance of an aborted transaction 110, abort handler component 130 may be operative to compare retry counter 118 to phase 1 retry threshold 120 and/or phase 2 retry threshold 122. In some embodiments, if retry counter 118 is less than phase 1 retry threshold 120, abort handler component 130 may be operative to instruct execution component 114 to retry the transaction 110 in the first hardware phase. In various embodiments, if retry counter 118 is less than phase 2 retry threshold 122 but not less than phase 1 retry threshold 120, abort handler component 130 may be operative to instruct execution component 114 to retry the transaction 110 in the second hardware phase. In some embodiments, if retry counter 118 is not less than phase 2 retry threshold 122, abort handler component 130 may be operative to instruct execution component 114 to retry the transaction 110 in the software phase. In various embodiments, tracking component 116 may be operative to adaptively determine values for phase 1 retry threshold 120 and/or phase 2 retry threshold 122 based on numbers of successful and/or unsuccessful commits for attempted transactions. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 2:
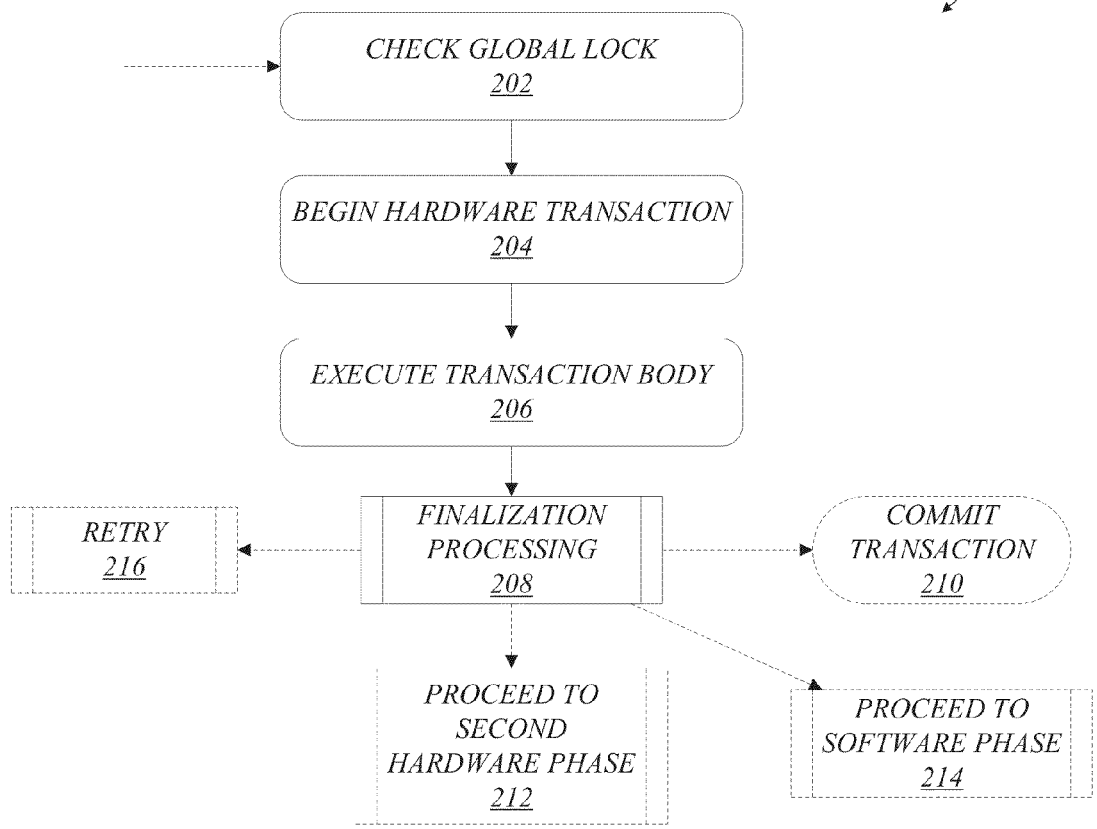
FIG. 2 illustrates one embodiment of a first logic flow.

FIG. 2 illustrates one embodiment of a logic flow 200, which may be representative of the operations executed by one or more embodiments described herein. More particularly, logic flow 200 may comprise an example of operations performed at apparatus 100 and/or system, 140 of FIG. 1 during handling of any particular transaction in a first hardware phase. As shown in logic flow 200, a global lock may be checked at 202. For example, execution component 114 of FIG. 1 may be operative to check global lock 112. At 204, the hardware transaction may begin. For example, execution component 114 of FIG. 1 may be operative to commence processing a transaction 110 in the first hardware phase. At 206, the transaction body may be executed. For example, execution component 114 of FIG. 1 may be operative to execute the transaction 110 in hardware.

At 208, a finalization processing algorithm may be applied, as will be discussed in more detail with respect to FIG. 5 below. One possible result of the finalization processing algorithm may be that the transaction may be committed at 210. For example, finalization component 128 of FIG. 1 may be operative to commit the transaction 110. A second possible result of the finalization processing algorithm may be that processing of the transaction proceeds to the second hardware phase at 212. For example, finalization component 128 and abort handler component 130 of FIG. 1 may be operative to determine that the transaction 110 should be aborted and retried in the second hardware phase. A third possible result of the finalization processing algorithm may be that processing of the transaction proceeds directly to the software phase at 214. For example, finalization component 128 and abort handler component 130 of FIG. 1 may be operative to determine that the transaction 110 should be aborted and retried in the software phase. A fourth possible result of the finalization processing algorithm may be that the transaction is retried in the first hardware phase at 216. For example, finalization component 128 and abort handler component 130 of FIG. 1 may be operative to determine that the transaction 110 should be aborted and retried in the first hardware phase. The embodiments are not limited to these examples.

Figure 3:
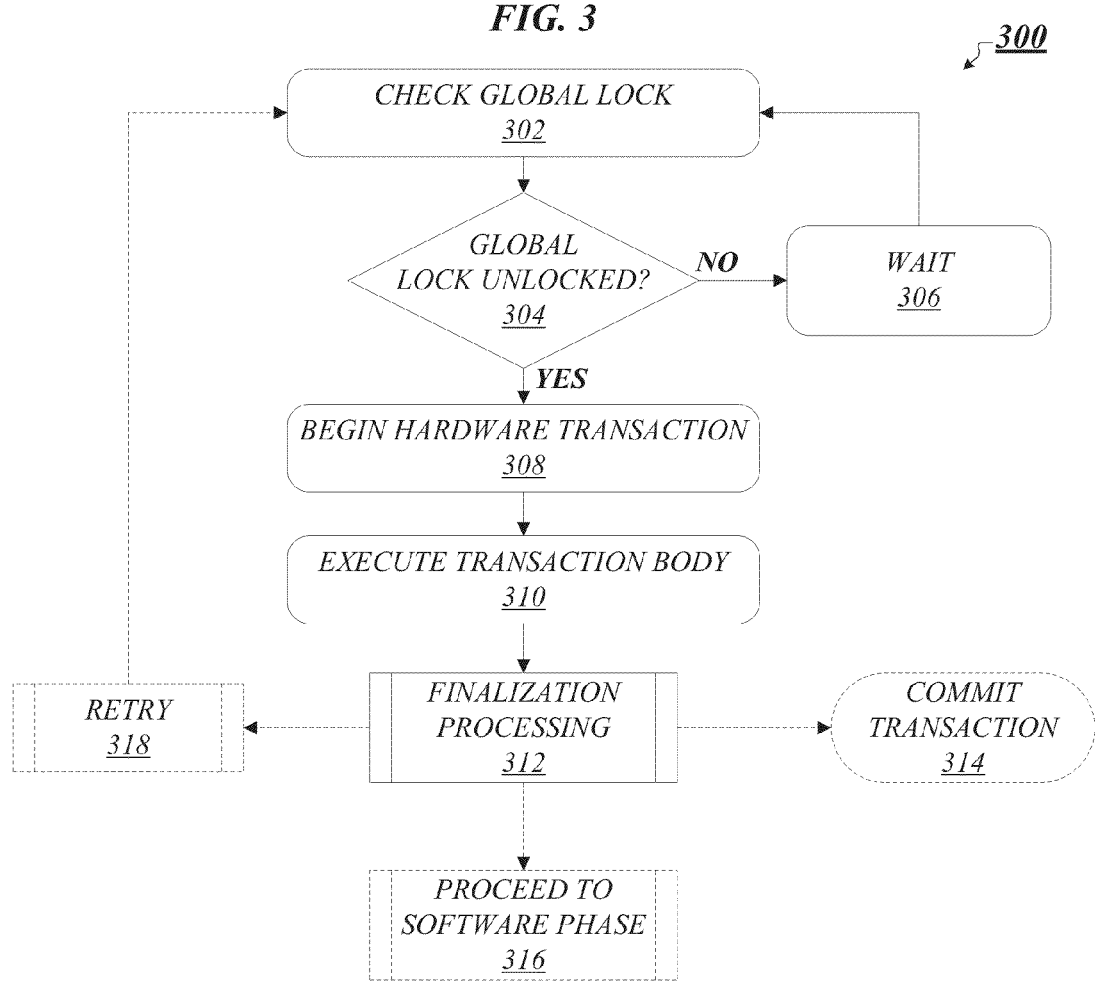
FIG. 3 illustrates one embodiment of a second logic flow.

FIG. 3 illustrates one embodiment of a logic flow 300, which may be representative of the operations executed by one or more embodiments described herein. More particularly, logic flow 300 may comprise an example of operations performed at apparatus 100 and/or system, 140 of FIG. 1 during handling of any particular transaction in a second hardware phase. As shown in logic flow 300, a global lock may be checked at 302. For example, execution component 114 of FIG. 1 may be operative to check global lock 112. At 304, a decision may be performed based on whether the global lock is unlocked. If the global lock is not unlocked, flow may pass to 306, where a wait operation may be performed, after which the global lock may be rechecked. For example, if execution component 114 of FIG. 1 determines that global lock 112 is set, it may perform a wait operation and then recheck the global lock 112. If, at 304, it is determined that the global lock is unlocked, flow may pass to 308. At 308, the hardware transaction may begin. For example, execution component 114 of FIG. 1 may be operative to commence processing a transaction 110 in the second hardware phase. At 310, the transaction body may be executed. For example, execution component 114 of FIG. 1 may be operative to execute the transaction 110 in hardware.

At 312, a finalization processing algorithm may be applied, as will be discussed in more detail with respect to FIG. 5 below. One possible result of the finalization processing algorithm may be that the transaction may be committed at 314. For example, finalization component 128 of FIG. 1 may be operative to commit the transaction 110. A second possible result of the finalization processing algorithm may be that processing of the transaction proceeds to the software phase at 316. For example, finalization component 128 and abort handler component 130 of FIG. 1 may be operative to determine that the transaction 110 should be aborted and retried in the software phase. A third possible result of the finalization processing algorithm may be that the transaction is retried in the second hardware phase at 318. For example, finalization component 128 and abort handler component 130 of FIG. 1 may be operative to determine that the transaction 110 should be aborted and retried in the second hardware phase. The embodiments are not limited to these examples.

Figure 4:
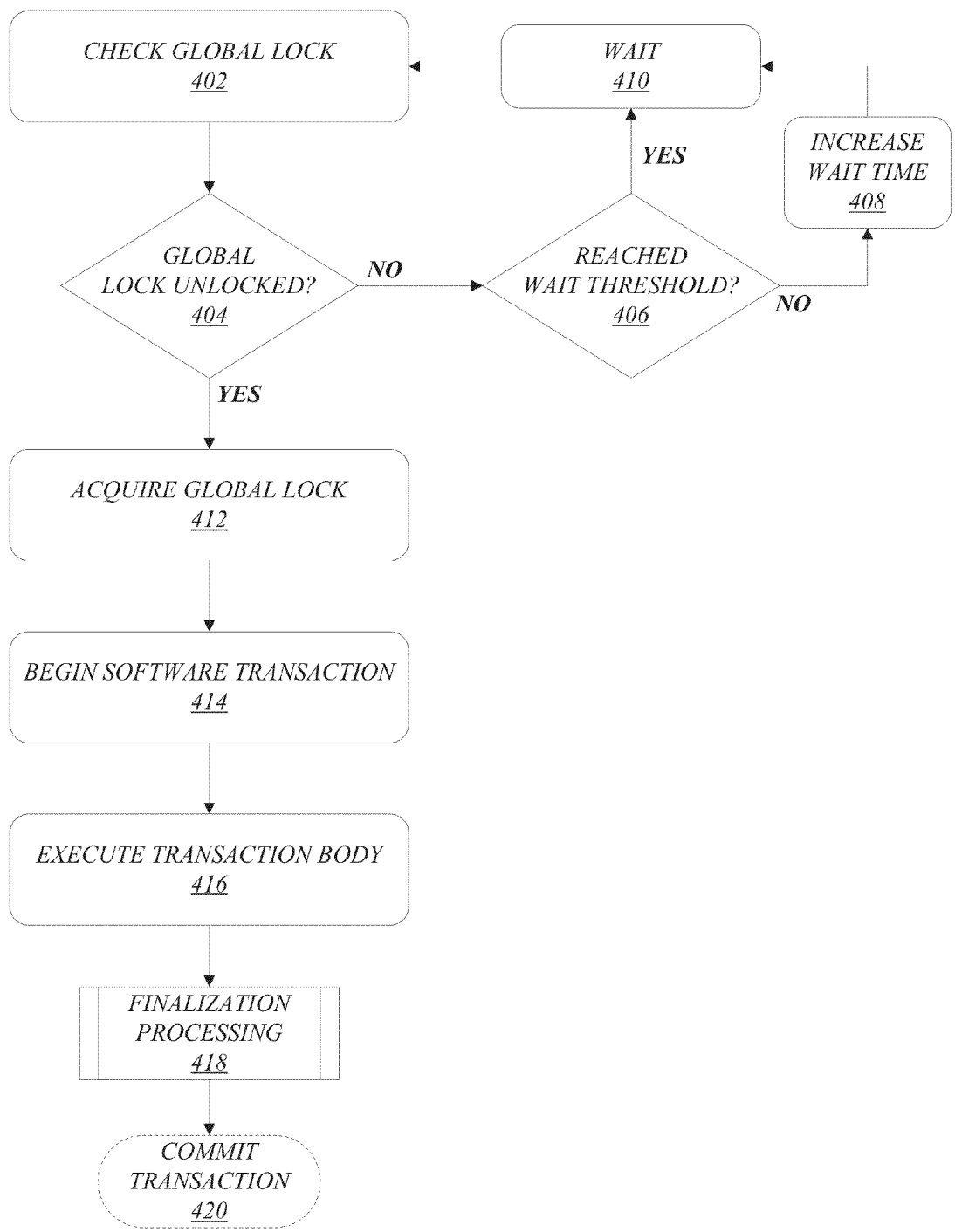
FIG. 4 illustrates one embodiment of a third logic flow.

FIG. 4 illustrates one embodiment of a logic flow 400, which may be representative of the operations executed by one or more embodiments described herein. More particularly, logic flow 400 may comprise an example of operations performed at apparatus 100 and/or system, 140 of FIG. 1 during handling of any particular transaction in a software phase. As shown in logic flow 400, a global lock may be checked at 402. For example, execution component 114 of FIG. 1 may be operative to check global lock 112. At 404, a decision may be performed based on whether the global lock is unlocked. If the global lock is not unlocked, flow may pass to 406.

At 406, it may be determined whether a wait threshold has been reached. For example, tracking component 116 of FIG. 1 may be operative to determine whether wait time 124 has reached wait threshold 126. If it is determined that the wait time has not reached the wait threshold, flow may pass to 408, where the wait time may be increased. For example, if tracking component 116 of FIG. 1 determines that wait time 124 has not reached wait threshold 126, it may increase wait time 124. From 408, flow may pass to 410, where a wait comprising a duration equal to the wait time may be performed, after which the global lock may be rechecked. For example, execution component 114 of FIG. 1 may perform a wait comprising a duration equal to wait time 124 and then recheck the global lock 112. If, at 406, it is determined that the wait threshold has been reached, flow may pass directly to 410 without the wait time being increased at 408.

If, at 404, it is determined that the global lock is unlocked, flow may pass to 412. At 412, the global lock may be acquired on behalf of the transaction to be executed in software. For example, tracking component 116 may be operative to acquire global lock 112 on behalf of a transaction 110 to be executed in software by execution component 114. At 414, the software transaction may begin. For example, execution component 114 of FIG. 1 may be operative to commence processing the transaction 110 in the software phase. At 416, the transaction body may be executed. For example, execution component 114 of FIG. 1 may be operative to execute the transaction 110 in software. At 418, a finalization processing algorithm may be applied, as will be discussed in more detail with respect to FIG. 5 below. Application of the finalization processing algorithm may result in the transaction being committed at 420. For example, finalization component 128 of FIG. 1 may be operative to commit the transaction 110. The embodiments are not limited to these examples.

Figure 5:
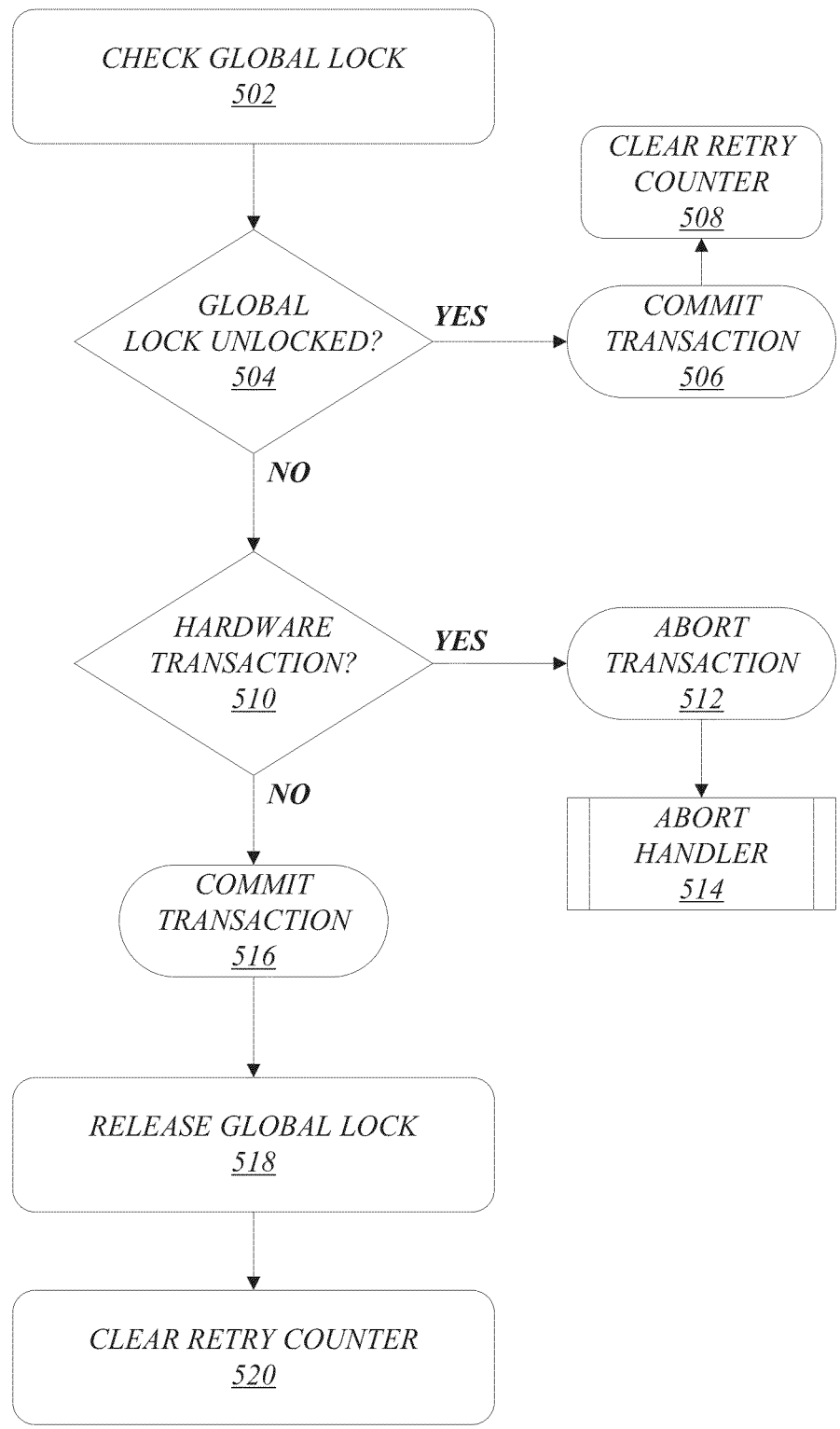
FIG. 5 illustrates one embodiment of a fourth logic flow.

FIG. 5 illustrates one embodiment of a logic flow 500, which may be representative of the operations executed by one or more embodiments described herein. More particularly, logic flow 500 may comprise an example of operations performed by finalization component 128 of FIG. 1 in the application of a finalization processing algorithm following an execution of a transaction 110. As shown in FIG. 5, a global lock may be checked at 502. For example, execution component 114 of FIG. 1 may be operative to check global lock 112. At 504, a decision may be performed based on whether the global lock is unlocked. If the global lock is not unlocked, flow may pass to 506, where the transaction may be committed. For example, if global lock 112 of FIG. 1 is unlocked, finalization component 128 may be operative to commit the transaction 110. Flow may then pass to 508, where a retry counter may be cleared. For example, tracking component 116 of FIG. 1 may be operative to clear retry counter 118.

If it is determined at 504 that the global lock is locked, flow may pass to 510. At 510, it may be determined whether the transaction is a hardware transaction. For example, tracking component 116 of FIG. 1 may be operative to determine whether the transaction 110 is a hardware transaction. If it is determined that the transaction is a hardware transaction, flow may pass to 512, where the transaction may be aborted. For example, execution component 114 of FIG. 1 may be operative to abort the transaction 110. From 512, flow may pass to 514, where an abort handling algorithm may be applied. For example, abort handler component 130 of FIG. 1 may be operative to apply an abort handling algorithm when a transaction 110 is aborted. If it is determined at 510 that the transaction is a software transaction, flow may pass to 516, where the transaction may be committed. For example, if tracking component 116 of FIG. 1 determines that the transaction 110 is a software transaction, finalization component 128 may be operative to commit the transaction. At 518, the global lock may be released. For example, finalization component 128 of FIG. 1 may be operative to release the global lock 112. At 520, the retry counter may be cleared. For example, tracking component 116 of FIG. 1 may be operative to clear retry counter 118. The embodiments are not limited to these examples.

Figure 6:
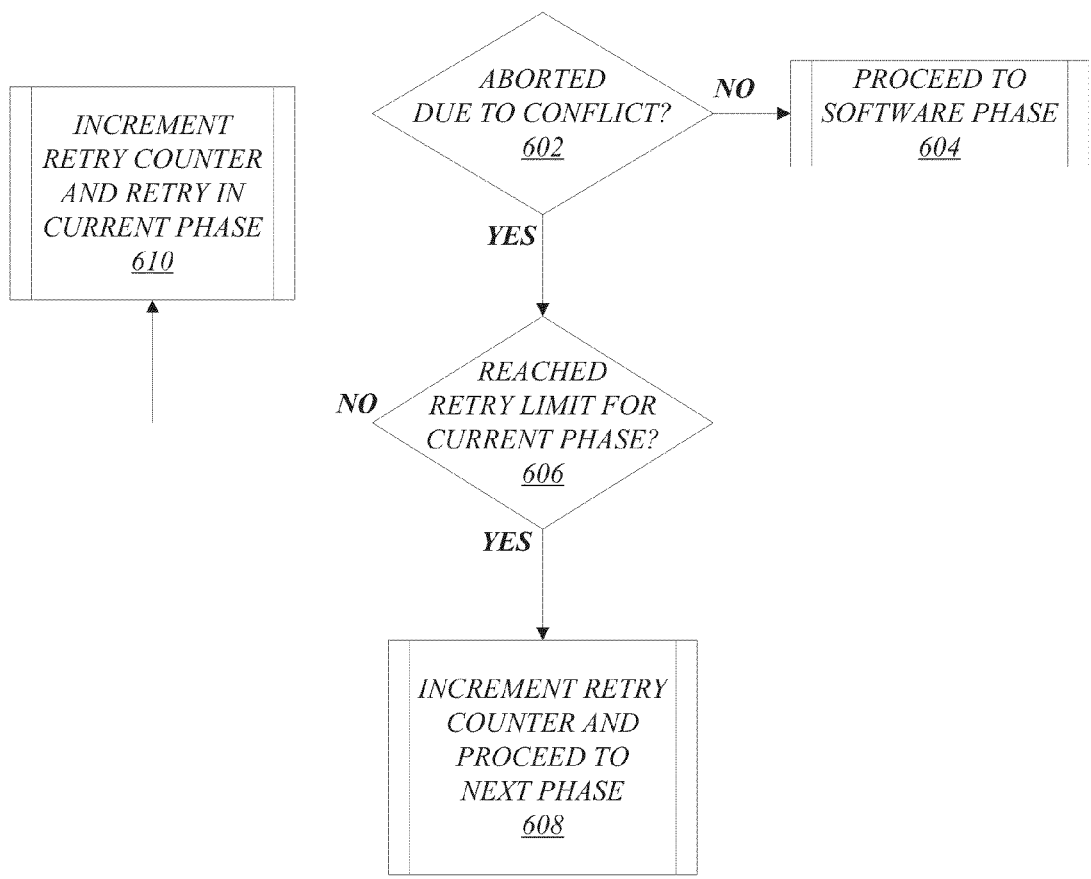
FIG. 6 illustrates one embodiment of a fifth logic flow.

FIG. 6 illustrates one embodiment of a logic flow 600, which may be representative of the operations executed by one or more embodiments described herein. More particularly, logic flow 600 may comprise an example of operations performed by abort handler component 130 of FIG. 1 in application of an abort handling algorithm once finalization component 128 has determined that a transaction 110 is to be aborted. As shown in FIG. 6, at 602, a decision may be performed based on whether an aborted transaction was aborted due to a conflict or potential conflict with another transaction, rather than due to another issue such as an illegal instruction, a capacity overflow, or a cache associativity overflow due to irregular memory access patterns. If it is determined that the transaction was aborted for a reason other than a conflict or potential conflict with another instruction, flow may pass to 604, where the transaction may proceed to a software phase. For example, if abort handler component 130 of FIG. 1 determines that a transaction 110 aborted due to an illegal instruction, capacity overflow, a cache associativity overflow, or another issue, it may be operative to instruct execution component 114 to process the transaction in the software phase. If it is determined at 602 that the transaction was aborted due to a conflict or potential conflict with another transaction, flow may pass to 606.

At 606, it may be determined whether a retry limit for a current phase has been reached. For example, tracking component 116 may be operative to determine whether retry counter 118 is equal to or greater than phase 1 retry threshold 120 and/or phase 2 retry threshold 122. If it is determined that the retry limit for the current phase has been reached, flow may pass to 608. At 608, the retry counter may be incremented and processing of the transaction may proceed to the next phase. For example, if tracking component 116 determines that the retry limit for the current phase has been reached, it may increment the retry counter and instruct execution component 114 to commence processing the transaction 110 in the next phase. If, at 606, it is determined that the retry limit for the current phase has not been reached, flow may pass to 610. At 610, the retry counter may be incremented and the transaction may be retried in the current phase. For example, if tracking component 116 determines that the retry limit for the current phase has not been reached, it may increment the retry counter and instruct execution component 114 to retry the transaction 110 in the current phase. The embodiments are not limited to these examples.

FIG. 7 illustrates an embodiment of a storage medium 700. The storage medium 700 may comprise an article of manufacture. In one embodiment, the storage medium 700 may comprise any non-transitory computer readable medium or machine-readable medium, such as an optical, magnetic or semiconductor storage. The storage medium may store various types of computer executable instructions, such as instructions to implement one or more of logic flows 200, 300, 400, 500, and 600. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 8:
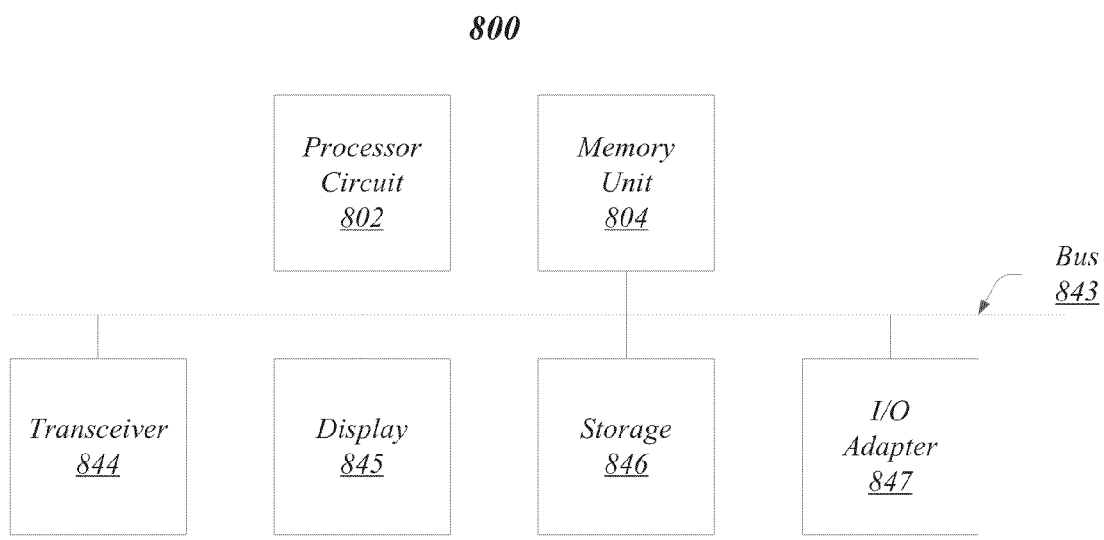
FIG. 8 illustrates one embodiment of a second system.

FIG. 8 illustrates one embodiment of a system 800. In various embodiments, system 800 may be representative of a system or architecture suitable for use with one or more embodiments described herein, such as apparatus 100 and/or system 140 of FIG. 1, logic flow 200 of FIG. 2, logic flow 300 of FIG. 3, logic flow 400 of FIG. 4, logic flow 500 of FIG. 5, logic flow 600 of FIG. 6, and/or storage medium 700 of FIG. 7. The embodiments are not limited in this respect.

As shown in FIG. 8, system 800 may include multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In various embodiments, system 800 may include a processor element 802. Processor element 802 may be implemented using any processor or logic device, and may be the same as or similar to processor element 102 of FIG. 1.

In one embodiment, system 800 may include a memory element 804 to couple to processor element 802. Memory element 804 may be coupled to processor element 802 via communications bus 843, or by a dedicated communications bus between processor element 802 and memory element 804, as desired for a given implementation. Memory element 804 may be implemented using any machine-readable or computer-readable media capable of storing data, including both volatile and non-volatile memory, and may be the same as or similar to memory element 104 of FIG. 1. In some embodiments, the machine-readable or computer-readable medium may include a non-transitory medium. The embodiments are not limited in this context.

In various embodiments, system 800 may include a transceiver 844. Transceiver 844 may include one or more radios capable of transmitting and receiving signals using various suitable wireless communications techniques, and may be the same as or similar to transceiver 144 of FIG. 1.

In various embodiments, system 800 may include a display 845. Display 845 may comprise any display device capable of displaying information received from processor element 802. Examples for display 845 may include a television, a monitor, a projector, and a computer screen. In one embodiment, for example, display 845 may be implemented by a liquid crystal display (LCD), light emitting diode (LED) or other type of suitable visual interface. Display 845 may comprise, for example, a touch-sensitive color display screen. In various implementations, display 845 may comprise one or more thin-film transistors (TFT) LCD including embedded transistors. The embodiments are not limited in this context.

In various embodiments, system 800 may include storage 846. Storage 846 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 846 may include technology to increase the storage performance enhanced protection for valuable digital media when multiple hard drives are included, for example. Further examples of storage 846 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 800 may include one or more I/O adapters 847. Examples of I/O adapters 847 may include Universal Serial Bus (USB) ports/adapters, IEEE 1394 Firewire ports/adapters, and so forth. The embodiments are not limited in this context.

FIG. 9 illustrates an embodiment of a system 900. In various embodiments, system 900 may be representative of a system or architecture suitable for use with one or more embodiments described herein, such as apparatus 100 and/or system 140 of FIG. 1, logic flow 200 of FIG. 2, logic flow 300 of FIG. 3, logic flow 400 of FIG. 4, logic flow 500 of FIG. 5, logic flow 600 of FIG. 6, and/or storage medium 700 of FIG. 7, and/or system 800 of FIG. 8. The embodiments are not limited in this respect.

As shown in FIG. 9, system 900 may include multiple elements. One or more elements may be implemented using one or more circuits, components, registers, processors, software subroutines, modules, or any combination thereof, as desired for a given set of design or performance constraints. Although FIG. 9 shows a limited number of elements in a certain topology by way of example, it can be appreciated that more or less elements in any suitable topology may be used in system 900 as desired for a given implementation. The embodiments are not limited in this context.

In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 900 includes a platform 901 coupled to a display 945. Platform 901 may receive content from a content device such as content services device(s) 948 or content delivery device(s) 949 or other similar content sources. A navigation controller 950 including one or more navigation features may be used to interact with, for example, platform 901 and/or display 945. Each of these components is described in more detail below.

In embodiments, platform 901 may include any combination of a processor element 902, chipset 903, memory element 904, transceiver 944, storage 946, applications 951, and/or graphics subsystem 952. Chipset 903 may provide intercommunication among processor element 902, memory element 904, transceiver 944, storage 946, applications 951, and/or graphics subsystem 952. For example, chipset 903 may include a storage adapter (not depicted) capable of providing intercommunication with storage 946.

Processor element 902 may be implemented using any processor or logic device, and may be the same as or similar to processor element 802 in FIG. 8.

Memory element 904 may be implemented using any machine-readable or computer-readable media capable of storing data, and may be the same as or similar to memory element 804 in FIG. 8.

Transceiver 944 may include one or more radios capable of transmitting and receiving signals using various suitable wireless communications techniques, and may be the same as or similar to transceiver 844 in FIG. 8.

Display 945 may include any television type monitor or display, and may be the same as or similar to display 845 in FIG. 8.

Storage 946 may be implemented as a non-volatile storage device, and may be the same as or similar to storage 846 in FIG. 8.

Graphics subsystem 952 may perform processing of images such as still or video for display. Graphics subsystem 952 may be a graphics processing unit (GPU) or a visual processing unit (VPU), for example. An analog or digital interface may be used to communicatively couple graphics subsystem 952 and display 945. For example, the interface may be any of a High-Definition Multimedia Interface, DisplayPort, wireless HDMI, and/or wireless HD compliant techniques. Graphics subsystem 952 could be integrated into processor element 902 or chipset 903. Graphics subsystem 952 could be a stand-alone card communicatively coupled to chipset 903.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 948 may be hosted by any national, international and/or independent service and thus accessible to platform 901 via the Internet, for example. Content services device(s) 948 may be coupled to platform 901 and/or to display 945. Platform 901 and/or content services device(s) 948 may be coupled to a network 953 to communicate (e.g., send and/or receive) media information to and from network 953. Content delivery device(s) 949 also may be coupled to platform 901 and/or to display 945.

In embodiments, content services device(s) 948 may include a cable television box, personal computer, network, telephone, Internet enabled devices or appliance capable of delivering digital information and/or content, and any other similar device capable of unidirectionally or bidirectionally communicating content between content providers and platform 901 and/display 945, via network 953 or directly. It will be appreciated that the content may be communicated unidirectionally and/or bidirectionally to and from any one of the components in system 900 and a content provider via network 953. Examples of content may include any media information including, for example, video, music, medical and gaming information, and so forth.

Content services device(s) 948 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 901 may receive control signals from navigation controller 950 having one or more navigation features. The navigation features of navigation controller 950 may be used to interact with a user interface 954, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 950 may be echoed on a display (e.g., display 945) by movements of a pointer, cursor, focus ring, or other visual indicators displayed on the display. For example, under the control of software applications 951, the navigation features located on navigation controller 950 may be mapped to virtual navigation features displayed on user interface 954. In embodiments, navigation controller 950 may not be a separate component but integrated into platform 901 and/or display 945. Embodiments, however, are not limited to the elements or in the context shown or described herein.

In embodiments, drivers (not shown) may include technology to enable users to instantly turn on and off platform 901 like a television with the touch of a button after initial boot-up, when enabled, for example. Program logic may allow platform 901 to stream content to media adaptors or other content services device(s) 948 or content delivery device(s) 949 when the platform is turned "off." In addition, chip set 903 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 900 may be integrated. For example, platform 901 and content services device(s) 948 may be integrated, or platform 901 and content delivery device(s) 949 may be integrated, or platform 901, content services device(s) 948, and content delivery device(s) 949 may be integrated, for example. In various embodiments, platform 901 and display 945 may be an integrated unit. Display 945 and content service device(s) 948 may be integrated, or display 945 and content delivery device(s) 949 may be integrated, for example. These examples are not meant to limit the disclosed subject matter.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 901 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
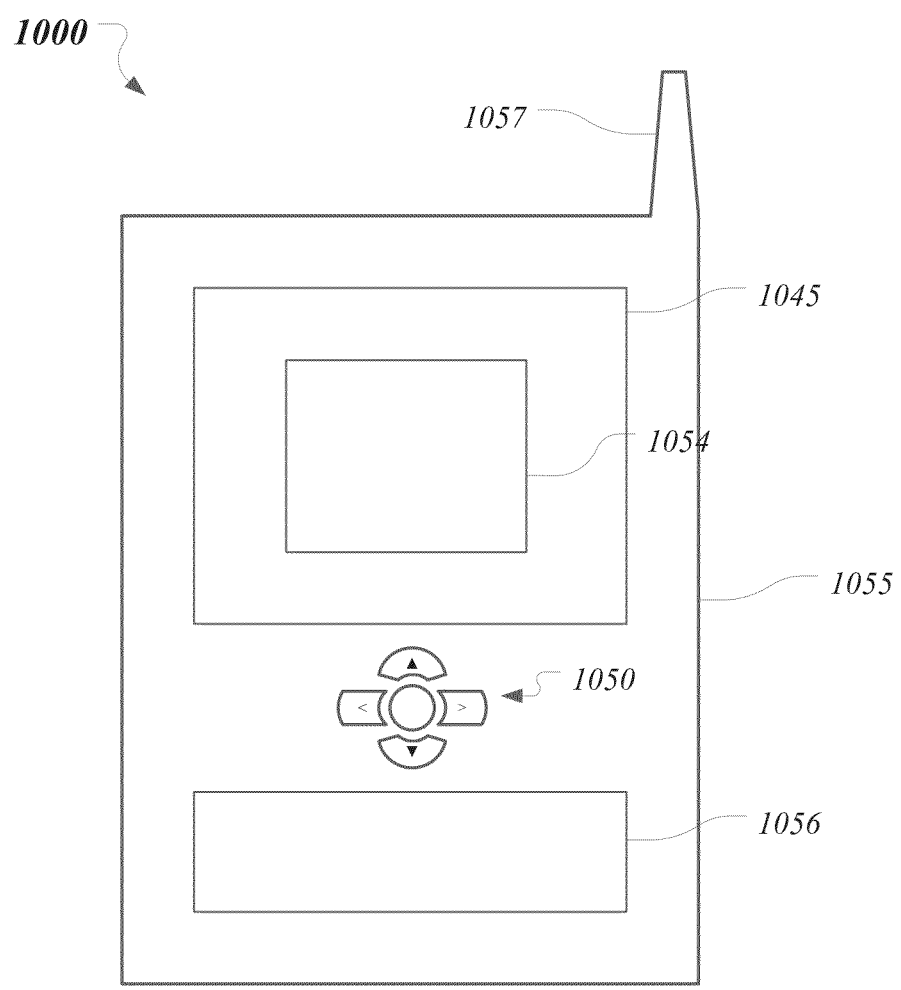
FIG. 10 illustrates one embodiment of a device.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a display 1045, a navigation controller 1050, a user interface 1054, a housing 1055, an I/O device 1056, and an antenna 1057. Display 1045 may include any suitable display unit for displaying information appropriate for a mobile computing device, and may be the same as or similar to display 945 in FIG. 9. Navigation controller 1050 may include one or more navigation features which may be used to interact with user interface 1054, and may be the same as or similar to navigation controller 950 in FIG. 9. I/O device 1056 may include any suitable I/O device for entering information into a mobile computing device. Examples for I/O device 1056 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a transactional memory apparatus, comprising: a processor element; an execution component for execution by the processor element to concurrently execute a software transaction and a hardware transaction according to a transactional memory process; a tracking component for execution by the processor element to activate a global lock to indicate that the software transaction is undergoing execution; and a finalization component for execution by the processor element to commit the software transaction and deactivate the global lock when execution of the software transaction completes, the finalization component to abort the hardware transaction when the global lock is active when execution of the hardware transaction completes.

In Example 2, the execution component of Example 1 may optionally be for execution by the processor element to concurrently execute the software transaction, the hardware transaction, and a second hardware transaction.

In Example 3, the finalization component of any one of Examples 1 to 2 may optionally be for execution by the processor element to commit the hardware transaction when the global lock is inactive when execution of the hardware transaction completes.

In Example 4, the transactional memory apparatus of any one of Examples 1 to 3 may optionally comprise an abort handler component for execution by the processor element to determine an execution phase for a re-execution of the hardware transaction when the hardware transaction is aborted.

In Example 5, the abort handler component of Example 4 may optionally be for execution by the processor element to instruct the execution component to re-execute the hardware transaction in a software phase when it determines that the hardware transaction was not aborted due to a conflict with another transaction.

In Example 6, the abort handler component of any one of Examples 4 to 5 may optionally be for execution by the processor element to determine the execution phase for the re-execution of the hardware transaction by comparing a retry counter value to one or more retry threshold values.

In Example 7, the execution component of any one of Examples 1 to 6 may optionally be for execution by the processor element to execute the hardware transaction in a first hardware phase when a retry counter value is less than a retry threshold value for the first hardware phase, and to execute the hardware transaction in a second hardware phase when the retry counter value is greater than or equal to the retry threshold value for the first hardware phase but less than a retry threshold value for the second hardware phase.

In Example 8, the execution component of Example 7 may optionally be for execution by the processor element to commence execution of the hardware transaction without waiting for the global lock to enter an inactive state during the first hardware phase, and wait for the global lock to enter an inactive state before commencing execution of the hardware transaction in the second hardware phase.

In Example 9, the execution component of any one of Examples 1 to 8 may optionally be for execution by the processor element to wait for the global lock to enter an inactive state before commencing execution of a second software transaction.

In Example 10, the execution component of Example 9 may optionally be for execution by the processor element to check the global lock before commencing execution of the second software transaction, and when the global lock is in an active state, to wait for a duration defined by a wait time and then to recheck the global lock.

In Example 11, the tracking component of Example 10 may optionally be for execution by the processor element to increase the wait time each time the execution component checks the global lock and the global lock is in an active state, until the wait time reaches a wait threshold value.

In Example 12, the processor element of any one of Examples 1 to 11 may optionally comprise a multi-core processor.

In Example 13, the hardware transaction of any one of Examples 1 to 12 may optionally be generated by a first thread on the multi-core processor, and the software transaction may be generated by a second thread on the multi-core processor.

In Example 14, a transactional memory system may comprise an apparatus according to any one of Examples 1 to 13 and a transceiver, and the processor element may optionally generate one or both of the hardware transaction and the software transaction based at least in part on information received via the transceiver.

Example 15 is a transactional memory method, comprising: concurrently executing, by a processor element, a software transaction and a hardware transaction according to a transactional memory process; activating a global lock to indicate that the software transaction is undergoing execution; committing the software transaction and deactivating the global lock when execution of the software transaction completes; and committing the hardware transaction when the global lock is inactive when execution of the hardware transaction completes.

In Example 16, the transactional memory method of Example 15 may optionally comprise concurrently executing the software transaction, the hardware transaction, and a second hardware transaction.

In Example 17, the transactional memory method of any one of Examples 15 to 16 may optionally comprise aborting the hardware transaction when the global lock is active when execution of the hardware transaction completes.

In Example 18, the transactional memory method of any one of Examples 15 to 17 may optionally comprise determining an execution phase for a re-execution of the hardware transaction when the hardware transaction is aborted.

In Example 19, the transactional memory method of Example 18 may optionally comprise re-executing the hardware transaction in a software phase when it is determined that the hardware transaction was not aborted due to a conflict with another transaction.

In Example 20, the transactional memory method of any one of Examples 18 to 19 may optionally comprise determining the execution phase for the re-execution of the hardware transaction by comparing a retry counter value to one or more retry threshold values.

In Example 21, the transactional memory method of any one of Examples 15 to 20 may optionally comprise: executing the hardware transaction in a first hardware phase when a retry counter value is less than a retry threshold value for the first hardware phase; and executing the hardware transaction in a second hardware phase when the retry counter value is greater than or equal to the retry threshold value for the first hardware phase but less than a retry threshold value for the second hardware phase.

In Example 22, the transactional memory method of Example 21 may optionally comprise: commencing execution of the hardware transaction without waiting for the global lock to enter an inactive state during the first hardware phase; and waiting for the global lock to enter the inactive state before commencing execution of the hardware transaction during the second hardware phase.

In Example 23, the transactional memory method of any one of Examples 15 to 22 may optionally comprise waiting for the global lock to enter an inactive state before commencing execution of a second software transaction.

In Example 24, the transactional memory method of Example 23 may optionally comprise: checking the global lock before commencing execution of the second software transaction; and when the global lock is in an active state, waiting for a duration defined by a wait time and then rechecking the global lock.

In Example 25, the transactional memory method of Example 24 may optionally comprise increasing the wait time each time the global lock is in an active state when checked, until the wait time reaches a wait threshold value.

In Example 26, the processor element of any one of Examples 15 to 25 may optionally comprise a multi-core processor.

In Example 27, the hardware transaction of any one of Examples 15 to 26 may optionally be generated by a first thread on the multi-core processor, and the software transaction may optionally be generated by a second thread on the multi-core processor.

In Example 28, at least one machine-readable medium may store a plurality of instructions that, in response to being executed on a computing device, cause the computing device to perform a transactional memory method according to any one of Examples 15 to 27.

In Example 29, an apparatus may comprise means for performing a transactional memory method according to any one of Examples 15 to 27.

In Example 30, a communications device may be arranged to perform a transactional memory method according to any one of Examples 15 to 27.

Example 31 is a transactional memory apparatus, comprising: means for concurrently executing a software transaction and a hardware transaction according to a transactional memory process; means for activating a global lock to indicate that the software transaction is undergoing execution; means for committing the software transaction and deactivating the global lock when execution of the software transaction completes; and means for committing the hardware transaction when the global lock is inactive when execution of the hardware transaction completes.

In Example 32, the transactional memory apparatus of Example 31 may optionally comprise means for concurrently executing the software transaction, the hardware transaction, and a second hardware transaction.

In Example 33, the transactional memory apparatus of any one of Examples 31 to 32 may optionally comprise means for aborting the hardware transaction when the global lock is active when execution of the hardware transaction completes.

In Example 34, the transactional memory apparatus of any one of Examples 31 to 33 may optionally comprise means for determining an execution phase for a re-execution of the hardware transaction when the hardware transaction is aborted.

In Example 35, the transactional memory apparatus of Example 34 may optionally comprise means for re-executing the hardware transaction in a software phase when it is determined that the hardware transaction was not aborted due to a conflict with another transaction.

In Example 36, the transactional memory apparatus of any one of Examples 34 to 35 may optionally comprise means for determining the execution phase for the re-execution of the hardware transaction by comparing a retry counter value to one or more retry threshold values.

In Example 37, the transactional memory apparatus of any one of Examples 31 to 36 may optionally comprise: means for executing the hardware transaction in a first hardware phase when a retry counter value is less than a retry threshold value for the first hardware phase; and means for executing the hardware transaction in a second hardware phase when the retry counter value is greater than or equal to the retry threshold value for the first hardware phase but less than a retry threshold value for the second hardware phase.

In Example 38, the transactional memory apparatus of Example 37 may optionally comprise: means for commencing execution of the hardware transaction without waiting for the global lock to enter an inactive state during the first hardware phase; and means for waiting for the global lock to enter the inactive state before commencing execution of the hardware transaction during the second hardware phase.

In Example 39, the transactional memory apparatus of any one of Examples 31 to 38 may optionally comprise means for waiting for the global lock to enter an inactive state before commencing execution of a second software transaction.

In Example 40, the transactional memory apparatus of Example 39 may optionally comprise: means for checking the global lock before commencing execution of the second software transaction; and means for, when the global lock is in an active state, waiting for a duration defined by a wait time and then rechecking the global lock.

In Example 41, the transactional memory apparatus of Example 40 may optionally comprise means for increasing the wait time each time the global lock is in an active state when checked, until the wait time reaches a wait threshold value.

In Example 42, the transactional memory apparatus of any one of Examples 31 to 36 may optionally comprise means for concurrently executing the software transaction and the hardware transaction by a multi-core processor.

In Example 43. The transactional memory apparatus of Example 42 may optionally comprise means for generating the hardware transaction by a first thread on the multi-core processor and generating the software transaction by a second thread on the multi-core processor.

Numerous specific details have been set forth herein to provide a thorough understanding of the embodiments. It will be understood by those skilled in the art, however, that the embodiments may be practiced without these specific details.

In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a processor element;
an execution component for execution by the processor element to concurrently execute a software transaction and a hardware transaction according to a transactional memory process, execute the hardware transaction in a first hardware phase when a retry counter value is less than a retry threshold value for the first hardware phase, and to execute the hardware transaction in a second hardware phase when the retry counter value is greater than or equal to the retry threshold value for the first hardware phase but less than a retry threshold value for the second hardware phase;
a tracking component for execution by the processor element to activate a global lock to indicate that the software transaction is undergoing execution; and
a finalization component for execution by the processor element to commit the software transaction and deactivate the global lock when execution of the software transaction completes, the finalization component to abort the hardware transaction when the global lock is active when execution of the hardware transaction completes.

2. The apparatus of claim 1, the execution component to concurrently execute the software transaction, the hardware transaction, and a second hardware transaction.

3. The apparatus of claim 1, the finalization component to commit the hardware transaction when the global lock is inactive when execution of the hardware transaction completes.

4. The apparatus of claim 1, comprising an abort handler component for execution by the processor element to determine an execution phase for a re-execution of the hardware transaction when the hardware transaction is aborted.

5. The apparatus of claim 4, the abort handler component to instruct the execution component to re-execute the hardware transaction in a software phase when it determines that the hardware transaction was not aborted due to a conflict with another transaction.

6. The apparatus of claim 4, the abort handler component to determine the execution phase for the re-execution of the hardware transaction by comparing a retry counter value to one or more retry threshold values.

7. The apparatus of claim 1, the execution component to commence execution of the hardware transaction without waiting for the global lock to enter an inactive state during the first hardware phase, and wait for the global lock to enter an inactive state before commencing execution of the hardware transaction in the second hardware phase.

8. The apparatus of claim 1, the execution component to wait for the global lock to enter an inactive state before commencing execution of a second software transaction.

9. The apparatus of claim 1, the processor element comprising a multi-core processor.

10. The apparatus of claim 1, comprising a transceiver, the processor element to generate one or both of the hardware transaction and the software transaction based at least in part on information received via the transceiver.

11. At least one non-transitory machine-readable medium storing a set of instructions that, in response to being executed on a computing device, cause the computing device to:
- concurrently execute a software transaction and a hardware transaction according to a transactional memory process, the hardware transaction to execute in a first hardware phase when a retry counter value is less than a retry threshold value for the first hardware phase, and to execute the hardware transaction in a second hardware phase when the retry counter value is greater than or equal to the retry threshold value for the first hardware phase but less than a retry threshold value for the second hardware phase;
- activate a global lock to indicate that the software transaction is undergoing execution;
- commit the software transaction and deactivate the global lock when execution of the software transaction completes; and
- commit the hardware transaction when the global lock is inactive when execution of the hardware transaction completes.

12. The at least one non-transitory machine-readable medium of claim 11, storing instructions that, in response to being executed on the computing device, cause the computing device to concurrently execute the software transaction, the hardware transaction, and a second hardware transaction.

13. The at least one non-transitory machine-readable medium of claim 11, storing instructions that, in response to being executed on the computing device, cause the computing device to abort the hardware transaction when the global lock is active when execution of the hardware transaction completes.

14. The at least one non-transitory machine-readable medium of claim 11, storing instructions that, in response to being executed on the computing device, cause the computing device to determine an execution phase for a re-execution of the hardware transaction when the hardware transaction is aborted.

15. The at least one non-transitory machine-readable medium of claim 14, storing instructions that, in response to being executed on the computing device, cause the computing device to re-execute the hardware transaction in a software phase when it determines that the hardware transaction was not aborted due to a conflict with another transaction.

16. The at least one non-transitory machine-readable medium of claim 14, storing instructions that, in response to being executed on the computing device, cause the computing device to determine the execution phase for the re-execution of the hardware transaction by comparing a retry counter value to one or more retry threshold values.

17. The at least one non-transitory machine-readable medium of claim 11, storing instructions that, in response to being executed on the computing device, cause the computing device to:
- commence execution of the hardware transaction without waiting for the global lock to enter an inactive state during the first hardware phase; and
- wait for the global lock to enter the inactive state before commencing execution of the hardware transaction during the second hardware phase.

18. The at least one machine-readable medium of claim 11, storing instructions that, in response to being executed on the computing device, cause the computing device to wait for the global lock to enter an inactive state before commencing execution of a second software transaction.

19. The at least one non-transitory machine-readable medium of claim 11, the hardware transaction generated by a first thread on a multi-core processor, the software transaction generated by a second thread on the multi-core processor.

20. A method, comprising:
- concurrently executing, by a multi-core processor, a software transaction and a hardware transaction according to a transactional memory process, the hardware transaction executing in a first hardware phase when a retry counter value is less than a retry threshold value for the first hardware phase, and executing the hardware transaction in a second hardware phase when the retry counter value is greater than or equal to the retry threshold value for the first hardware phase but less than a retry threshold value for the second hardware phase;
- activating a global lock to indicate that the software transaction is undergoing execution;
- committing the software transaction and deactivating the global lock when execution of the software transaction completes;
- aborting the hardware transaction when the global lock is active when execution of the hardware transaction completes; and
- committing the hardware transaction when the global lock is inactive when execution of the hardware transaction completes.

21. The method of claim 20, comprising concurrently executing the software transaction, the hardware transaction, and a second hardware transaction.

22. The method of claim 20, comprising determining an execution phase for a re-execution of the hardware transaction when the hardware transaction is aborted.

23. The method of claim 20, comprising re-executing the hardware transaction in a software phase when it is determined that the hardware transaction was not aborted due to a conflict with another transaction.

* * * * *